United States Patent
Couwenhoven et al.

(10) Patent No.: US 6,407,825 B1
(45) Date of Patent: Jun. 18, 2002

(54) COLORANT REDUCTION METHOD FOR DIGITAL IMAGES

(75) Inventors: Douglas W. Couwenhoven, Fairport; Kevin E. Spaulding, Spencerport; Rodney L. Miller, Fairport, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/213,637

(22) Filed: Dec. 17, 1998

(51) Int. Cl.[7] .............................. G06F 15/00; G03F 3/08
(52) U.S. Cl. ........................................ 358/1.9; 358/518
(58) Field of Search .......................... 358/1.9, 1.1, 1.8, 358/518, 515, 534, 535, 539; 382/254, 275, 252

(56) References Cited

U.S. PATENT DOCUMENTS

| | | | |
|---|---|---|---|
| 4,930,018 A | | 5/1990 | Chan et al. ................. 358/298 |
| 5,014,333 A | * | 5/1991 | Miller et al. ................. 382/54 |
| 5,214,517 A | | 5/1993 | Sullivan et al. ............. 358/456 |
| 5,515,479 A | | 5/1996 | Klassen ....................... 395/109 |
| 5,563,985 A | | 10/1996 | Klassen et al. ............. 395/109 |
| 5,592,592 A | * | 1/1997 | Shu ............................. 395/109 |
| 5,684,932 A | * | 11/1997 | Shu ............................. 395/109 |
| 5,764,862 A | * | 6/1998 | Metcalfe et al. ............. 395/102 |
| 5,768,411 A | * | 6/1998 | Shu et al. .................... 382/162 |
| 5,822,451 A | | 10/1998 | Spaulding et al. .......... 382/162 |
| 5,867,607 A | * | 2/1999 | Shibuya et al. ............. 382/270 |
| 6,097,502 A | * | 8/2000 | Shu et al. ..................... 358/1.9 |
| 6,169,608 B1 | * | 1/2001 | Yoshida ....................... 358/1.9 |

* cited by examiner

*Primary Examiner*—Madeleine Nguyen
(74) *Attorney, Agent, or Firm*—Raymond L. Owens

(57) ABSTRACT

A method for modifying an input image having an (x,y) array of input pixels, each pixel having an input colorant amount for one or more color channels to form an output image with output colorant amounts, said output image being suitable for printing on a digital printing device having two or more printing levels, including determining an average total pixel colorant amount in a neighborhood of an input pixel in the input image; determining a colorant reduction amount for each color channel of the input pixel responsive to the input colorant amount, the average total pixel colorant amount, and a threshold colorant amount; determining an output colorant amount for each color channel of the input pixel responsive to the colorant reduction amount, the input colorant amount, and a spatially periodic dither signal, so that the average output colorant amount in a neighborhood of each pixel in the output image is constrained to be less than the threshold colorant amount; and repeating steps a) through c) for each pixel in the input image.

14 Claims, 5 Drawing Sheets

COLORANT REDUCTION METHOD FOR DIGITAL IMAGES

FIELD OF THE INVENTION

This invention pertains to the field of digital imaging, and more particularly to a colorant reduction method used during the process of printing a digital image.

BACKGROUND OF THE INVENTION

In the field of digital printing, a digital printer receives digital data from a computer and places colorant on a receiver to reproduce the image. A digital printer may use a variety of different technologies to transfer colorant to the page. Some common types of digital printers include inkjet, thermal dye transfer, thermal wax, electrophotographic, and silver halide printers.

Often when printing digital images, undesirable image artifacts may result when an excessive amount of colorant is placed in a small area on the page. These image artifacts degrade the image quality, and can result in an unacceptable print. In the case of an inkjet printer, some examples of these image artifacts include bleeding, cockling, banding, and noise. Bleeding is characterized by an undesirable mixing of colorants along a boundary between printed areas of different colorants. The mixing of the colorants results in poor edge sharpness, which degrades the image quality. Cockling is characterized by a warping or deformation of the receiver that can occur when printing excessive amounts of colorant. In severe cases, the receiver may warp to such an extent as to interfere with the mechanical motions of the printer, potentially causing damage to the printer. Banding refers to unexpected dark or light lines or streaks that appear running across the print, generally oriented along one of the axes of motion of the printer. Noise refers to undesired density or tonal variations that can give the print a grainy appearance, thus degrading the image quality. Although these artifacts are presented in the context of an inkjet printer, it is known to those skilled in the art that similar artifacts commonly exist with the other above mentioned printing technologies also.

In a digital printer, satisfactory density and color reproduction can generally be achieved without using the maximum possible amount of colorant. Therefore, using excessive colorant not only introduces the possibility of the above described image artifacts occurring, but is also a waste of colorant. This is disadvantageous, since the user will get fewer prints from a given quantity of colorant.

It has been recognized in the art that the use of excessive colorant when printing a digital image needs to be avoided. Generally, the amount of colorant needed to cause image artifacts (and therefore be considered excessive) is receiver, colorant, and printer technology dependent.

U.S. Pat. No. 4,930,018 to Chan et a. teaches a method of reducing paper cockle and graininess of inkjet prints utilizing multiple inks with different dye loadings. In this method, a given grey level can be reproduced a variety of different ways, some of which will use more colorant than others. The different ways to reproduce a given grey level are rank ordered according to the total ink coverage, and a selection is made by iterating through the order until one is found that satisfies a specified maximum coverage limit.

U.S. Pat. No. 5,515,479 to Klassen teaches a method for reducing marking material (i.e., ink) coverage in a printing process by determining the ink coverage for each pixel in an image, determining if too much ink will be placed on the page in a given area, and reducing the amount of ink to an acceptable level by turning "off" a fraction of the pixels in the given area. The determination of which pixels to turn off is made by using a processing order through each area which tends to randomize the turn off effect. While this method successfully reduces the amount of ink placed on the page in a given area, it can introduce pattern noise into the image because of the processing order method of selecting which pixels to turn off. Also, the pixels that are turned off in each color separation are not correlated, which can lead to a grainy appearance to an image region that should appear otherwise uniform.

U.S. Pat. No. 5,563,985 to Klassen et al. addresses the problem of pattern noise by selecting which pixels to turn off in response to a random number function. While this method successfully eliminates pattern noise that can be generated in a given area, it can introduce random noise into the image because the selection of which pixels to turn off is determined by a random process. While this may be visually less objectionable than pattern noise, it is still not optimal.

It has been demonstrated that the sensitivity of the human visual system decreases with increasing frequency of modulation. Thus, high frequency patterns are less visible to the human eye than low frequency patterns. In the art of digital halftoning, this effect is taken advantage of by designing halftoning algorithms that distribute the dots according to a high frequency pattern, also called "blue" noise. U.S. Pat. No. 5,214,517 to Sullivan et al. discloses a digital halftoning method using blue noise to obtain an output image with minimum visual noise. It is understood by those skilled in the art that random noise patterns (a.k.a "white" noise) contain information at all frequencies, and are therefore visually more objectionable than blue noise patterns.

Minimizing visual noise in digital halftoning by using blue noise dithering can be extended to images with multiple colorant channels, as disclosed in U.S. Pat. No. 5,822,451 to Spaulding et al., which teaches a method of jointly optimizing blue noise dither matricies for each colorant channel to minimize a visual cost function.

SUMMARY OF THE INVENTION

It is an object of the present invention to provide for producing high quality digital images that are free of the above described artifacts associated with using excessive amounts of colorant.

It is a further object of the present invention to reduce the amount of colorant used to print an image utilizing a blue noise dithering process to determine which pixels to remove colorant from, which results in improved image quality relative to the prior art.

Another object of the present invention is that the hue of a given color in the input image will not be significantly affected by reducing the amount of colorant to an acceptable level according to the invention.

Yet another object of the present invention is to provide for preferential removal of colorant from specified colorant channels.

These objects are achieved by a method for modifying an-input image having an (x,y) array of input pixels, each pixel having an input colorant amount for one or more color channels to form an output image with output colorant amounts, said output image being suitable for printing on a digital printing device having two or more printing levels, comprising the steps of:

a) determining an average total pixel colorant amount in a neighborhood of an input pixel in the input image;

b) determining a colorant reduction amount for each color channel of the input pixel responsive to the input colorant amount, the average total pixel colorant amount, and a threshold colorant amount;

c) determining an output colorant amount for each color channel of the input pixel responsive to the colorant reduction amount, the input colorant amount, and a spatially periodic dither signal, so that the average output colorant amount in a neighborhood of each pixel in the output image is constrained to be less than the threshold colorant amount; and d) repeating steps a) through c) for each pixel in the input image.

ADVANTAGES

The present invention has an advantage over the prior art in that it provides for reducing the amount of colorant required to print a digital image without introducing random noise into the image. The present invention utilizes a blue noise dithering process to determine the pixels from which colorant should be removed, which results in blue noise patterns that are visually less objectionable than random noise patterns. The use of a blue noise dithering process when determining the pixels from which colorant should be removed also provides a means to correlate the colorant reduction across the color separation channels, further reducing the objectionability of the noise and thus improving the image quality.

DETAILED DESCRIPTION OF THE INVENTION

This invention describes a method for reducing the amount of colorant used in printing a digital image to avoid undesirable image artifacts that degrade the image quality of a digital print.

An input image signal is composed of a two dimensional array of individual picture elements, or pixels, and can be represented as a function of two spatial coordinates, (x and y), and a colorant coordinate, c. Each unique combination of the spatial coordinates defines the location of a pixel within the image, wherein the pixel possesses data values representing the amount of colorant present at the given location for each of a number of different colorants represented by the colorant coordinate, c. Each data value representing the amount of colorant in a colorant channel is generally represented by numbers on the range {0,255}, and a typical set of colorants for an inkjet printer consists of cyan (C), magenta (M), yellow (Y), and black (K) inks. Although the present invention will be described in the context of an inkjet printer with C, M, Y, and K colorants, the present invention can be applied to other printer technologies and colorants as well.

Figure 1:
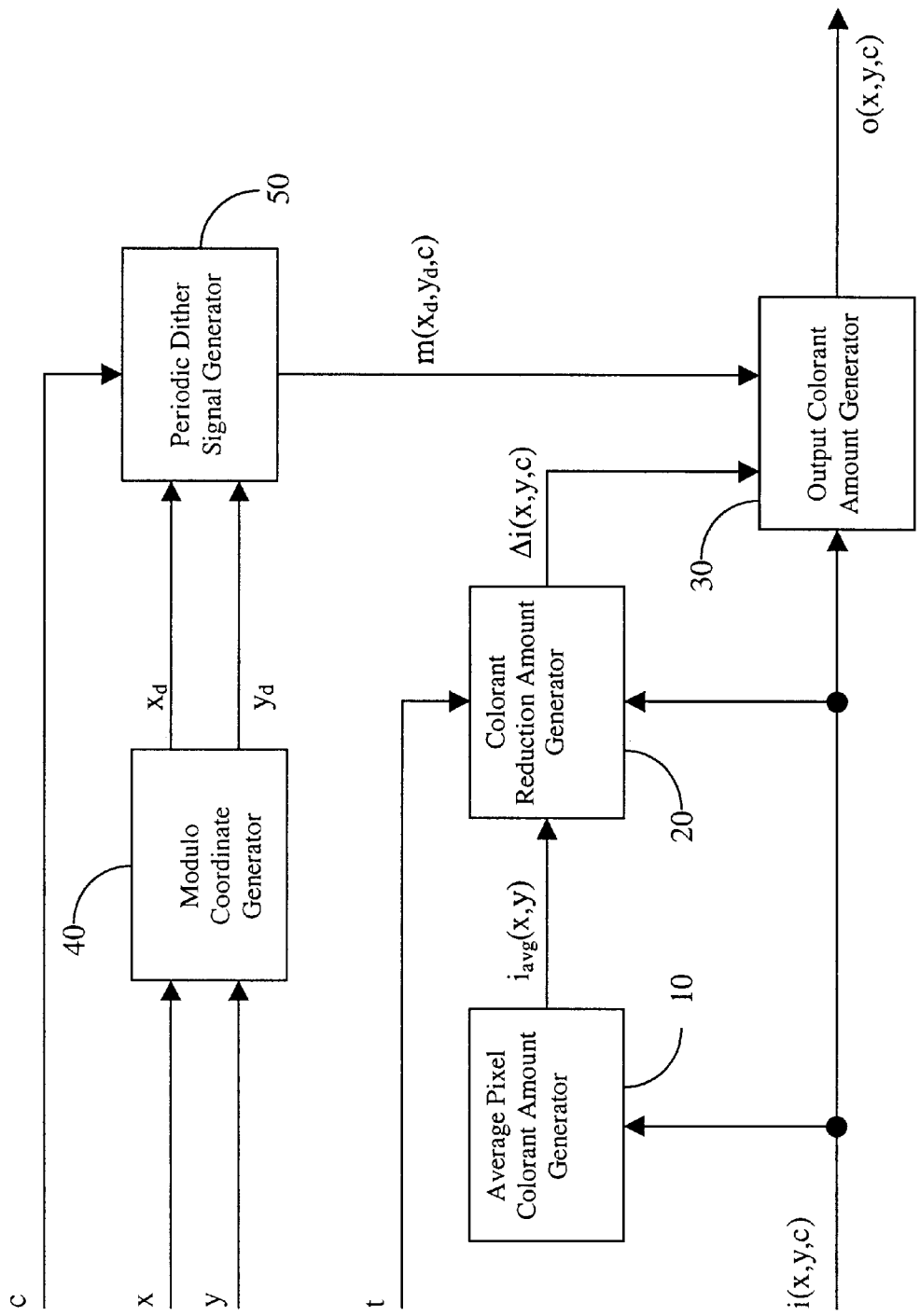
FIG. 1 is a block diagram showing the processing steps in a preferred embodiment of the present invention.

Referring to FIG. 1, the amount of colorant present at each pixel in the input image is represented by the input colorant amount, i(x,y,c), which is processed by an average pixel colorant amount generator 10, which computes an average amount of colorant that exists in a neighborhood of input image pixels centered around the current pixel, wherein x and y are spatial coordinates of the pixel and c is the color coordinate, (e.g. C, M, Y, or K). In a preferred embodiment, the average pixel total colorant amount, $i_{avg}(x,y)$, is computed as the arithmetic mean of all of the colorant amounts of all the pixels within a neighborhood of the current pixel, according to:

$$i_{avg}(x, y) = \frac{1}{CNM} \sum_{c=0}^{C-1} \sum_{n=0}^{N-1} \sum_{m=0}^{M-1} i\left(x+n-\frac{N}{2}, y+m-\frac{M}{2}, c\right) \quad \text{EQ 1}$$

where N and M are, respectively, the width and height of the neighborhood; the number of colorants is C; and wherein c, n, and m are integers. Note that $i_{avg}(x,y)$ represents the average amount of total colorant at the current pixel location, and is therefore not a function of the colorant, c. Alternate methods may be used to compute the average pixel total colorant amount, $i_{avg}(x,y)$. One such method is to use a set of weights $\Phi(x,y)$ to compute a weighted sum of the input pixel values according to:

$$i_{avg}(x, y) = \frac{1}{CNM} \sum_{c=0}^{C-1} \sum_{n=0}^{N-1} \sum_{m=0}^{M-1} i\left(x+n-\frac{N}{2}, y+m-\frac{M}{2}, c\right) \Phi(n, m) \quad \text{EQ 2}$$

Again referring to FIG. 1, a colorant reduction amount generator 20 receives the average pixel total colorant amount, $i_{avg}(x,y)$, the input colorant amount, i(x,y,c), and a threshold total colorant amount, t, and produces a colorant reduction amount, $\Delta i(x,y,c)$, which represents the amount of colorant that is to be removed from each colorant channel of the current pixel. The details of the colorant reduction amount generator 20 are shown in FIG. 2, and will now be described herein below.

Figure 2:
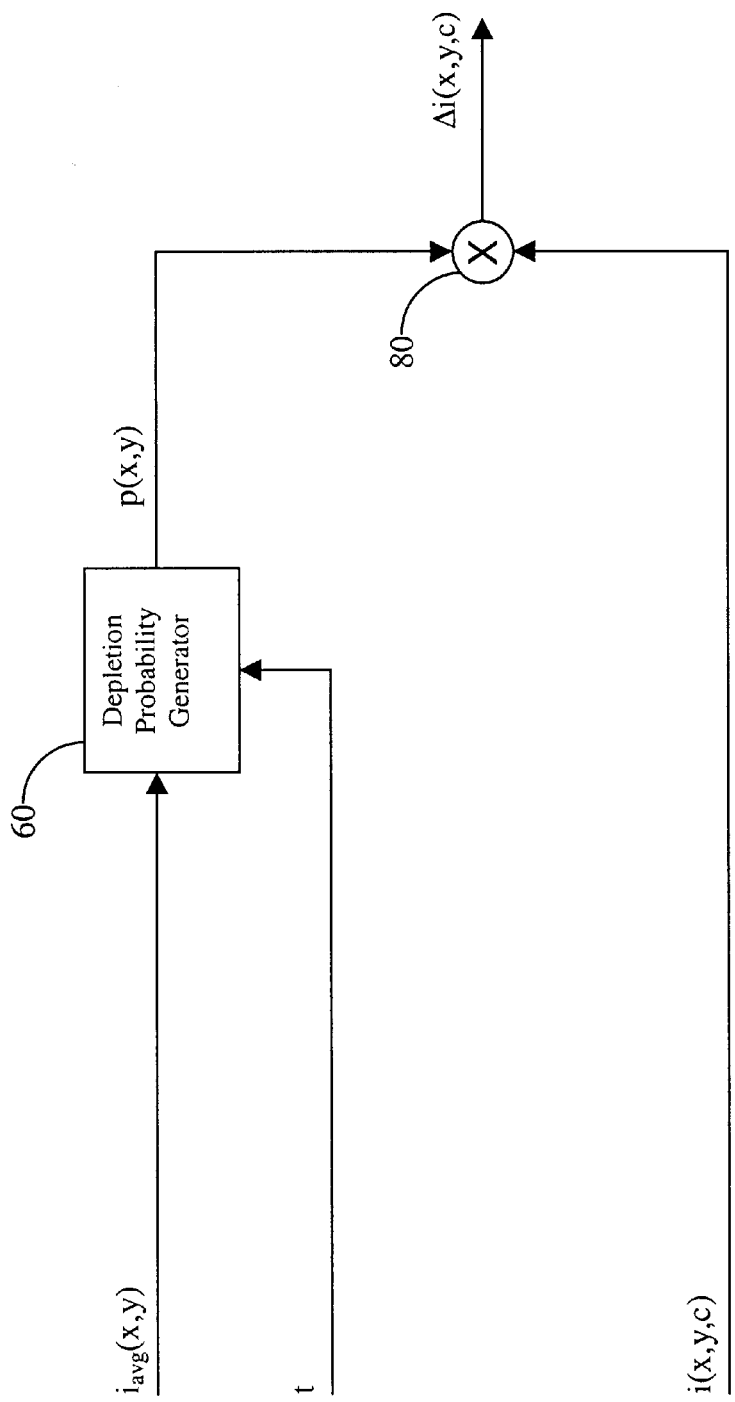
FIG. 2 is a block diagram showing additional detail of the colorant reduction amount generator shown in FIG. 1.

Referring now to FIG. 2, which shows the details of the colorant reduction amount generator 20 of FIG. 1, a depletion probability generator 60 receives the average pixel total colorant amount, $i_{avg}(x,y)$, and the threshold total colorant amount, t, and produces a depletion probability p(x,y), according to:

$$p(x, y) = \begin{cases} 1 - \frac{t}{i_{avg}(x, y)}, & i_{avg}(x, y) > t \\ 0, & \text{otherwise} \end{cases} \quad \text{EQ 3}$$

where p(x,y) represents the fraction of the total colorant amount that is desired to be removed from the current pixel. Note that if the average pixel total colorant amount is less than the threshold colorant amount, then the depletion probability will be 0, which ultimately results in the input image pixel at the current location remaining unchanged.

A multiplier 80 receives the depletion probability, p(x,y), and the input colorant amount, i(x,y,c), and produces the colorant reduction amount, $\Delta i(x,y,c)$, according to:

$$\Delta i(x,y,c) = p(x,y) i(x,y,c) \quad \text{EQ 4}$$

The colorant reduction amount represents the amount of colorant that should be removed from each colorant channel such that when the entire neighborhood of pixels surrounding the current pixel are processed, the average total amount of colorant at each pixel in the neighborhood satisfies the threshold total colorant amount. The present invention does not strictly require that the total colorant amount at each pixel satisfy the threshold total colorant amount, but rather the total colorant amount at each pixel in the neighborhood on average satisfies the threshold total colorant amount. Of course, those skilled in the art will recognize that the size of the neighborhood could be defined to be only the current pixel, which would result in strict pixel-wise conformance to the threshold total colorant amount.

Also, since the depletion probability p(x,y) is the same for all colorant channels, then the relative proportions of the colorants in the input image pixel will be maintained, on average. This serves to preserve the general hue of the input image pixels, which is desirable. As noted above, if the average pixel total colorant amount is less than the threshold colorant amount, then the depletion probability will be 0. Thus, the colorant reduction amount will be 0 for the current pixel, and the input image pixel will remain unchanged.

Referring back to FIG. 1, a modulo coordinate generator 40 receives the spatial coordinate values (x, y) of the current pixel, and produces modulo coordinate values $(x_d, y_d)$ according to:

$$x_d = \mod(x, m_x)$$

$$y_d = \mod(y, m_y) \quad \text{EQ 5}$$

where $(m_x, m_y)$ are horizontal and vertical periods of a spatially periodic dither signal, $m(x_d, y_d, c)$, and "mod" is the mathematical modulo operator. For example, a spatially periodic dither signal can be represented by an array of $(m_x, m_y) = (64, 64)$ coefficients for each colorant channel, but a dither matrix of any size may be applied to the present invention. Still referring to FIG. 1, a periodic dither signal generator 50 receives the modulo coordinate values $(x_d, y_d)$ and the colorant coordinate, c, and produces the spatially periodic dither signal, $m(x_d, y_d, c)$, by simply extracting the $(x_d, y_d)$ element of the dither matrix array for colorant c. An output colorant amount generator 30 then receives the spatially periodic dither signal, $m(x_d, y_d, c)$, the colorant reduction amount, $\Delta i(x,y,c)$, and the input colorant amount, $i(x,y,c)$, and produces the output colorant amount $o(x,y,c)$. The details of the output colorant amount generator 30 are shown in FIG. 3, and are described herein below.

Figure 3:
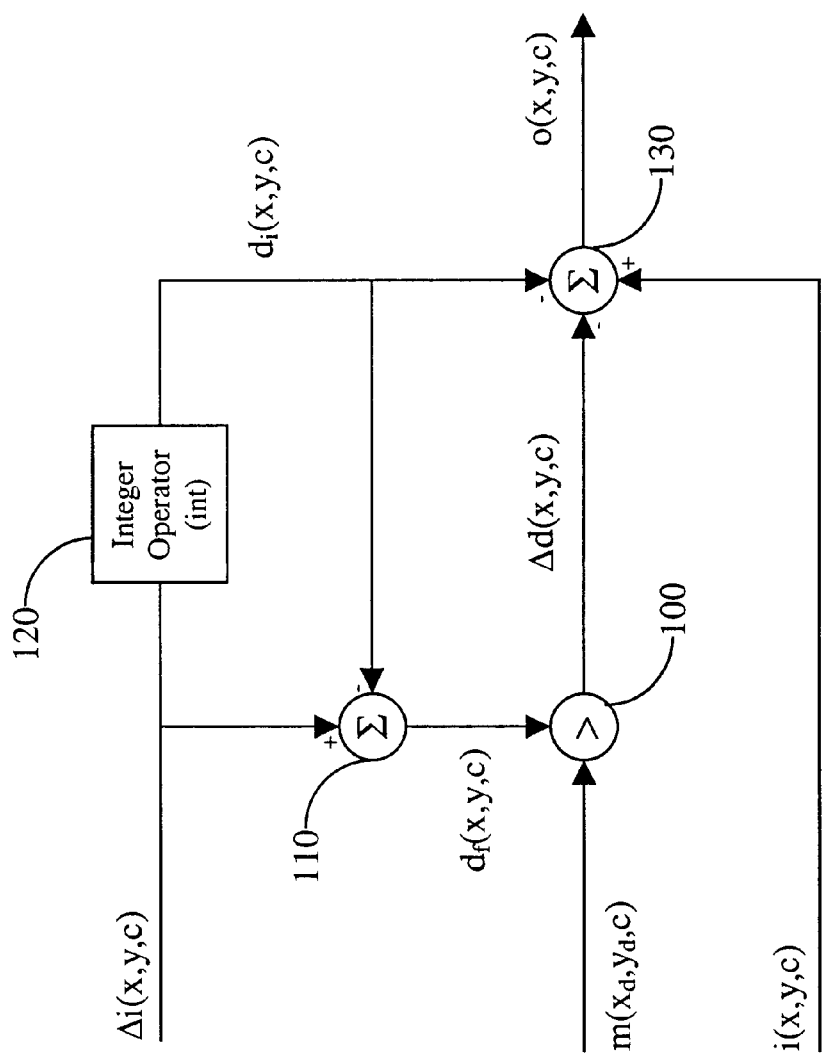
FIG. 3 is a block diagram showing additional detail of the output colorant amount generator shown in FIG. 1.

Referring now to FIG. 3, which shows the details of the output colorant amount generator 30 of FIG. 1, an integer operator 120 receives the colorant reduction amount, $\Delta i(x,y,c)$, and produces a first integer colorant reduction amount $d_i(x,y,c)$, according to:

$$d_i(x,y,c) = \text{int}(\Delta i(x,y,c)) \quad \text{EQ 6}$$

where "int" is the mathematical integer operator, which computes the largest integer less than or equal to its argument. An adder 110 receives the first integer colorant reduction amount $d_i(x,y,c)$, and the colorant reduction amount, $\Delta i(x,y,c)$, and produces a fractional colorant reduction amount, $d_f(x,y,c)$, according to:

$$d_f(x,y,c) = \Delta i(x,y,c) - d_i(x,y,c) \quad \text{EQ 7}$$

A comparator 100 then receives the fractional colorant reduction amount, $d_f(x,y,c)$, and the spatially periodic dither signal, $m(x_d, y_d, c)$, and produces a second integer colorant reduction amount, $\Delta d(x,y,c)$, according to:

$$\Delta d(x, y, c) = \begin{cases} 1, & d_f(x, y, c) > m(x_d, y_d, c) \\ 0, & \text{otherwise} \end{cases} \quad \text{EQ 8}$$

The use of a spatially periodic dither signal to determine the second integer colorant reduction amount provides for several key advantages of the present invention. Preferably, the present invention uses a dither matrix whose coefficients are arranged such that the resulting patterns have blue noise characteristics rather than random noise characteristics. Thus, when the colorant reduction amount for a given colorant channel is computed, the pixels that actually have colorant removed will be spatially distributed in a blue noise pattern. As discussed earlier, this pattern is less visible to the human vision system, and therefore results is a higher quality output image. Another preferred embodiment of the present invention uses a set of blue noise dither matricies that are jointly optimized amongst the colorant channels. The blue noise dither matricies for the different colorant channels are jointly optimized so that a pixel that has a high probability of removing cyan colorant, for example, would have a low probability of removing magenta or yellow colorant.

Still referring to FIG. 3, adder 130 receives the first integer colorant reduction amount $d_i(x,y,c)$, the second integer colorant reduction amount, $\Delta d(x,y,c)$, and the input colorant amount, $i(x,y,c)$, and produces the output colorant amount, $o(x,y,c)$, according to:

$$o(x,y,c) = i(x,y,c) - \Delta d(x,y,c) - d_i(x,y,c) \quad \text{EQ 9}$$

This completes the processing for the current output pixel. The steps described above are then repeated for each pixel in the input image to produce the output image.

In a second embodiment of the present invention, additional processing steps are added to further improve the image quality of the output image by preventing the occurrence of white pixels, as well as adding flexibility by allowing the user to specify the relative importance of the colorant channels. These two modifications will be discussed in detail herein below.

In some applications, it may be preferred to remove colorant from one colorant channel over another colorant channel. For example, consider an image pixel that has cyan, magenta, and black ink present, and we wish to remove one of these colorants in order to satisfy the threshold total colorant amount. If we remove the cyan or the magenta colorant from the pixel, then the resulting pixel will still appear predominantly black. However, if we remove the black colorant, then the resulting pixel will appear blue (which is the combination of cyan and magenta colorants). Thus, a larger color error will be made if the black colorant is removed than either the cyan or magenta colorants. In this case, it would be advantageous to remove the cyan or magenta colorant preferentially over the black colorant. This additional capability is accomplished by the specification of a set of color dependent scaling coefficients, w(c), where a smaller value indicates that the colorant should preferentially remain, and a larger value indicates that the colorant should be preferentially removed.

Figure 4:
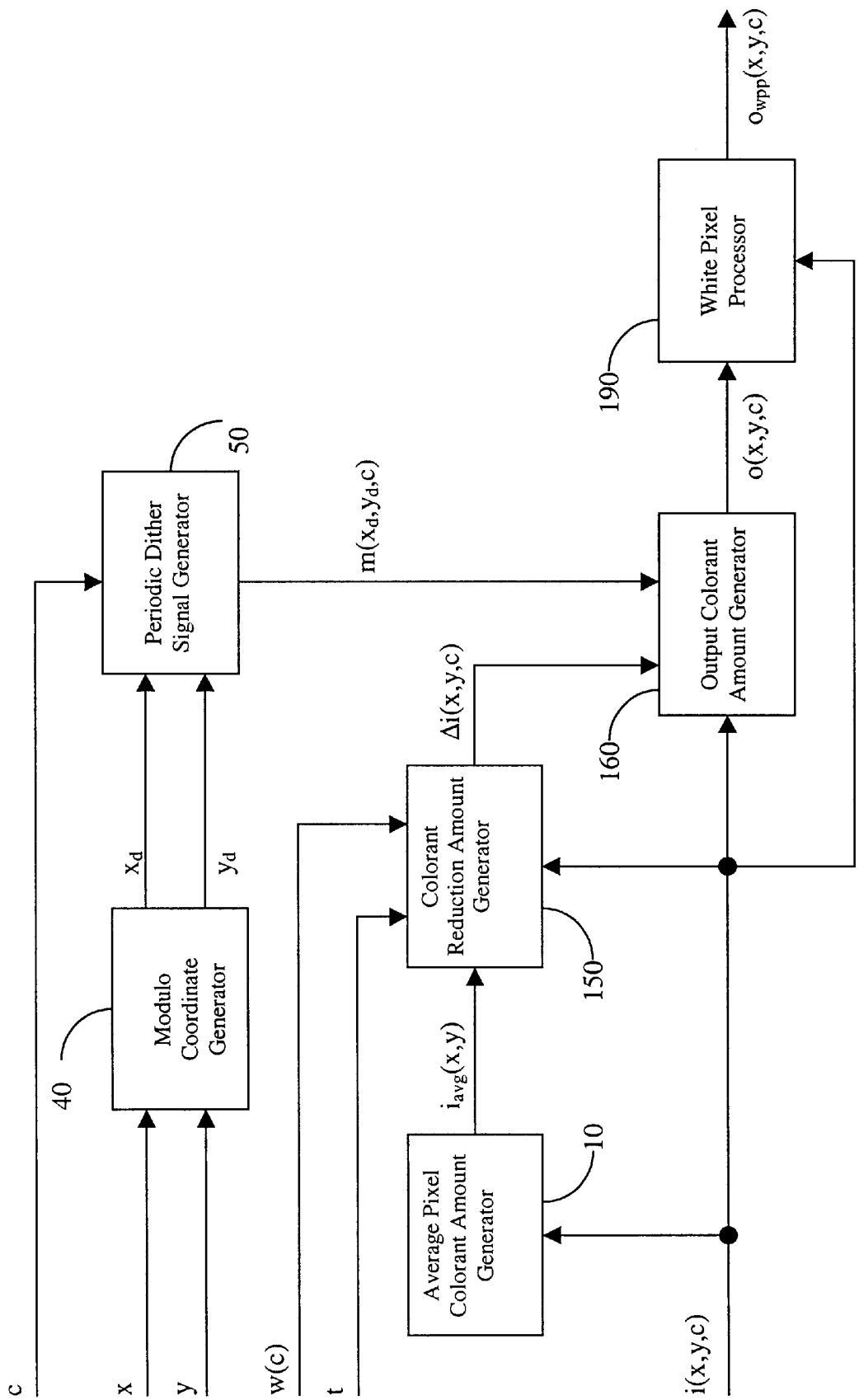
FIG. 4 is a block diagram showing another preferred embodiment of the present invention.

Turning now to FIG. 4, the processing steps of the second embodiment are shown in which the processing steps of FIG. 1 are duplicated, and the additional processing step of a white pixel processor 190, and input of a set of color dependent scaling coefficients, w(c), to a colorant reduction amount generator 150 are added. The details of the colorant reduction amount generator 150 are shown in FIG. 5, and are described herein below.

Figure 5:
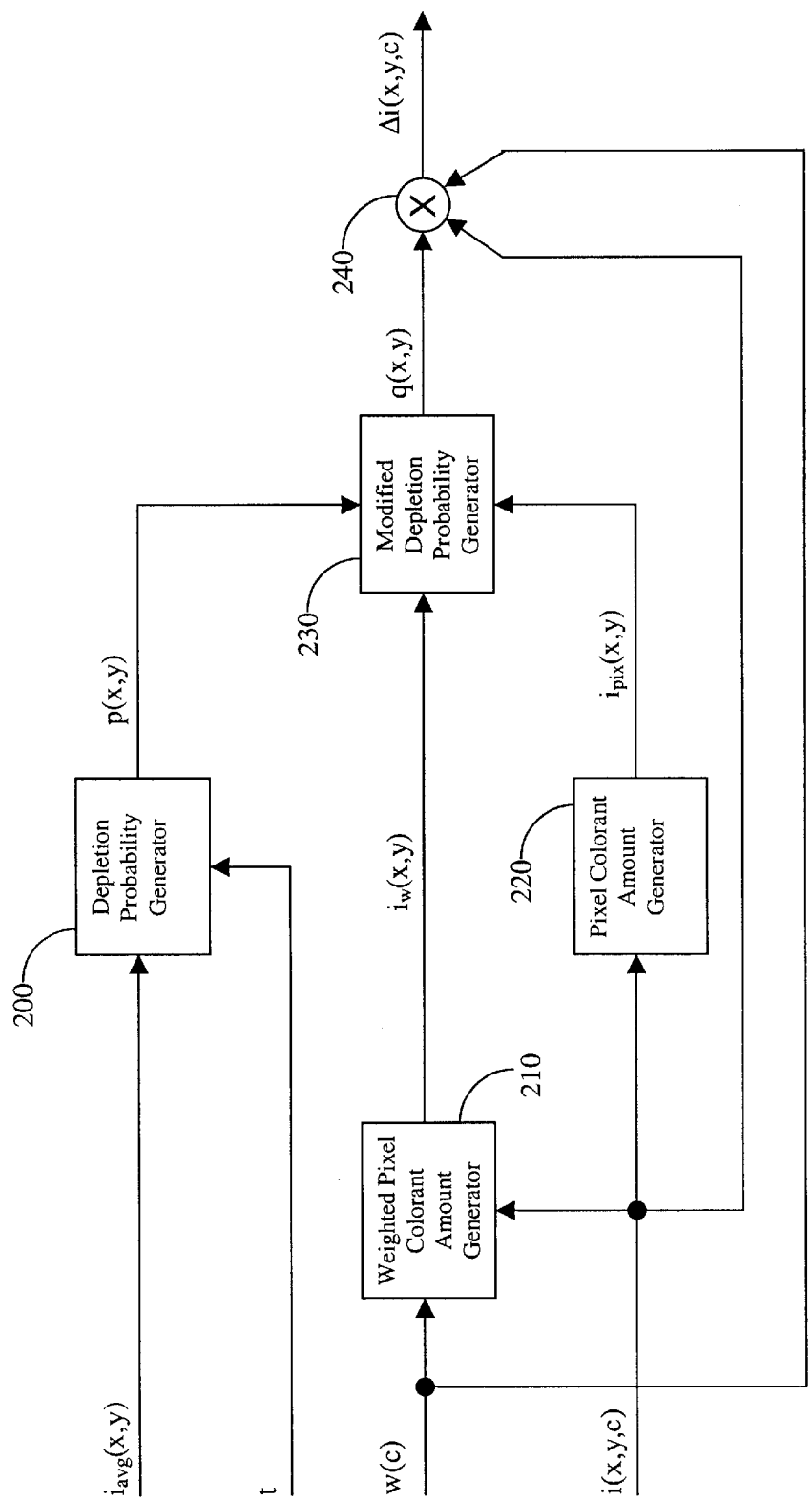
FIG. 5 is a block diagram showing additional detail of the colorant reduction amount generator of FIG. 4.

Referring now to FIG. 5, which shows the details of the colorant reduction amount generator 150 of FIG. 4, a depletion probability generator 200 receives the average pixel total colorant amount, $i_{avg}(x,y)$, and the threshold total colorant amount, t, and produces a depletion probability p(x,y), according to EQ 3. A weighted pixel colorant amount generator 210 receives the input colorant amount, i(x,y,c), and the color dependent scaling coefficients, w(c), and produces a weighted pixel total colorant amount, $i_w(x,y)$, according to:

$$i_w(x, y) = \frac{1}{C} \sum_{c=0}^{C-1} w(c)i(x, y, c) \qquad \text{EQ 10}$$

A pixel colorant amount generator 220 receives the input colorant amount, i(x,y,c), and produces a total pixel colorant amount, $i_{pix}(x,y)$, according to:

$$i_{pix}(x, y) = \frac{1}{C} \sum_{c=0}^{C-1} i(x, y, c) \qquad \text{EQ 11}$$

Then, a modified depletion probability generator 230 receives the depletion probability p(x,y), the weighted pixel total colorant amount, $i_w(x,y)$, and the total pixel colorant amount, $i_{pix}(x,y)$, and produces a modified depletion probability q(x,y) according to:

$$q(x, y) = \frac{p(x, y)i_{pix}(x, y)}{i_w(x, y)} \qquad \text{EQ 12}$$

The modified depletion probability serves the purpose of increasing the probability of removing colorant from channels that had larger scaling coefficients specified, and reducing the probability of removing colorant from channels that had a lower scaling coefficient. This effects the preferential treatment of the colorant channels via the color dependent scaling coefficients as introduced above. The final step in the process is a multiplier 240, which receives the modified depletion probability, q(x,y), the input colorant amount, i(x,y,c), and the color dependent scaling coefficients, w(c), and produces a colorant reduction amount, Δi(x,y,c), according to:

$$\Delta i(x,y,c) = q(x,y)i(x,y,c)w(c) \qquad \text{EQ 13}$$

Referring now back to FIG. 4, an output colorant amount generator 160 receives the spatially periodic dither signal, $m(x_d,y_d,c)$, the colorant reduction amount, Δi(x,y,c), and the input colorant amount, i(x,y,c), and produces the output colorant amount o(x,y,c). The details of the output colorant amount generator 160 are identical to the steps described in FIG. 3. If the colorant reduction amount is greater than the input colorant amount for any channel, then additional colorant may have to be removed from the other colorant channels.

With respect to the additional processing step of white pixel prevention, using a set of jointly optimized blue noise dither matricies to produce the spatially periodic dither signal statistically dramatically decreases the probability of all colorant being removed from a given pixel location, but does not entirely prevent it. Removing all colorant from a given pixel location results in a white pixel, which will generally be surrounded by darker pixels. This causes an objectionable artifact, and therefore needs to be prevented.

Referring again to FIG. 4, a white pixel processor 190 receives the output colorant amount, o(x,y,c), and the input colorant amount, i(x,y,c), and produces a white pixel processed output colorant amount, $o_{wpp}(x,y,c)$. First, the colorant channel that had the most colorant removed is identified by maximizing the following equation over c:

$$c_{max} = \max_c(i(x,y,c) - o(x,y,c)) \qquad \text{EQ 14}$$

where $c_{max}$ is the colorant channel that had the most colorant removed at the current pixel. In the event that more than one colorant channel had the maximum amount of colorant removed at the current pixel, then $c_{max}$ is chosen by cycling through the candidate colorant channels. Once $c_{max}$ has been identified, then the white pixel processed output colorant amount is computed according to:

$$o_{wpp}(x, y, c) = \begin{cases} o(x, y, c), & c \neq c_{max} \\ 1, & c = c_{max} \end{cases} \qquad \text{EQ 15}$$

Thus, white pixels are prevented from occurring in the output image because the output colorant amount is set to 1, indicating the presence of colorant for one of the colorant channels. As noted above, the extra processing of the white pixel processor 190 will rarely be required, since the spatially periodic dither signal are preferably jointly optimized amongst the colorant channels so that the probability of removing all colorant at any given pixel is low.

A computer readable storage medium that can be used in accordance with the present invention for storing a computer program for performing steps required by the present invention may comprise, for example, magnetic storage media such as magnetic disc (such as a floppy disc) or magnetic tape; optical storage media such as optical disc, optical tape, or machine readable bar code; solid state electronic storage devices such as random access memory (RAM), or read only memory (ROM); or any other physical device or medium employed to store a computer program (ROM).

The invention has been described in detail with particular reference to certain preferred embodiments thereof, but it will be understood that variations and modifications can be effected within the spirit and scope of the invention. In particular, the present invention has been described in the context of a binary inkjet printer which prints with cyan, magenta, yellow, and black colorants, but in theory the invention should apply to other types of printing technologies also. This includes multilevel inkjet printing in which more than two printing levels are available for at least one colorant at each pixel.

| PARTS LIST | |
|---|---|
| 10 | average pixel colorant amount generator |
| 20 | colorant reduction amount generator |
| 30 | output colorant amount generator |
| 40 | modulo coordinate generator |
| 50 | periodic dither signal generator |
| 60 | depletion probability generator |
| 80 | multiplier |
| 100 | comparator |
| 110 | adder |
| 120 | integer operator |
| 130 | adder |
| 150 | colorant reduction amount generator |
| 160 | output colorant amount generator |
| 190 | white pixel processor |
| 200 | depletion probability generator |
| 210 | weighted pixel colorant amount generator |
| 220 | pixel colorant amount generator |

PARTS LIST

| | |
|---|---|
| 230 | modified depletion probability generator |
| 240 | multiplier |

What is claimed is:

1. A method for modifying an input image having an (x,y) array of input pixels, each pixel having an input colorant amount for one or more color channels to form an output image with output colorant amounts, said output image being suitable for printing on a digital printing device having two or more printing levels, comprising the steps of:

a) determining an average total pixel colorant amount in a neighborhood of an input pixel in the input image;

b) determining a colorant reduction amount for each color channel of the input pixel responsive to the input colorant amount, the average total pixel colorant amount in a neighborhood of the input pixel, and a threshold colorant amount;

c) determining an output colorant amount for each color channel of the input pixel responsive to the colorant reduction amount, the input colorant amount, and a spatially periodic dither signal, so that an average output colorant amount in a neighborhood of each output pixel in the output image is constrained to be less than the threshold colorant amount; and d) repeating steps a) through c) for each pixel in the input image.

2. The method of claim 1 wherein the average total pixel colorant amount is determined from a sum of the input colorant amounts for pixel in a window centered on the input pixel.

3. The method of claim 1 wherein the average total pixel colorant amount is determined from a weighted sum of the input colorant amounts for pixels in a window centered on the input pixel.

4. The method of claim 3 wherein the weighted sum is determined using a set of weights whose values are determined by their location relative to the input pixel.

5. The method of claim 1 wherein step b) further includes the steps of:

i) computing a depletion probability for the input pixel responsive to the average total pixel colorant amount and the threshold colorant amount; and ii) computing the colorant reduction amount for each color channel of the input pixel responsive to the depletion probability and the input colorant amount.

6. The method of claim 5 wherein step ii) further includes scaling the colorant reduction amount by a set of color dependent scaling coefficients.

7. The method of claim 1 wherein step c) further includes the steps of:

a) computing a first integer colorant reduction amount from the colorant reduction amount;

b) computing a fractional colorant reduction amount from the difference between the colorant reduction amount and the first integer colorant reduction amount;

c) computing a second integer colorant reduction amount by comparing the fractional colorant reduction amount to the spatially periodic dither signal; and d) computing the output colorant amount by subtracting the first integer colorant reduction amount and the second integer colorant amount from the input colorant amount.

8. The method of claim 1 wherein the spatially periodic dither signal is a blue noise dither signal.

9. The method of claim 1 wherein the spatially periodic dither signal is determined by modularly addressing a dither matrix with (x,y) coordinates of the input pixel.

10. The method of claim 9 wherein the dither matrix is a blue noise dither matrix.

11. The method of claim 1 wherein the spatially periodic dither signal is different for each color channel.

12. The method of claim 11 wherein the spatially periodic dither signal for each color channel are designed jointly to minimize a visual cost function.

13. The method of claim 1 further including an additional step wherein the output colorant amount for at least one color channel is increased when the output colorant amount computed in step c) result in no colorant for all of the color channels.

14. A computer program product comprising a computer readable storage medium having a computer program stored thereon for modifying an input image having an (x,y) array of input pixels, each pixel having an input colorant amount for one or more color channels to form an output image with output colorant amounts, said output image being suitable for printing on a digital printing device having two or more printing levels for performing the steps of:

a) determining an average total pixel colorant amount in a neighborhood of an input pixel in the input image;

b) determining a colorant reduction amount for each color channel of the input pixel responsive to the input colorant amount, the average total pixel colorant amount in a neighborhood of the input pixel, and a threshold colorant amount;

c) determining an output colorant amount for each color channel of the input pixel responsive to the colorant reduction amount, the input colorant amount, and a spatially periodic dither signal, so that an average output colorant amount in a neighborhood of each output pixel in the output image is constrained to be less than the threshold colorant amount; and d) repeating steps a) through c) for each pixel in the input image.

* * * * *